(12) United States Patent
So et al.

(10) Patent No.: US 6,714,595 B1
(45) Date of Patent: Mar. 30, 2004

(54) SIGNAL TRANSMISSION CIRCUITS THAT USE MULTIPLE INPUT SIGNALS TO GENERATE A RESPECTIVE TRANSMIT SIGNAL AND METHODS OF OPERATING THE SAME

(75) Inventors: Byung-se So, Seoul (KR); Ga-pyo Nam, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/426,609

(22) Filed: Oct. 26, 1999

(30) Foreign Application Priority Data

Oct. 29, 1998 (KR) ............................................. 98-45734

(51) Int. Cl.[7] ............................................. H04L 25/10
(52) U.S. Cl. ...................... 375/257; 375/316; 375/219; 325/42
(58) Field of Search ................. 375/316, 219, 375/257; 325/42

(56) References Cited

U.S. PATENT DOCUMENTS 3,755,738 A * 8/1973 Gitlin et al. ................. 375/235
3,906,347 A * 9/1975 Motley et al. ............... 375/235
5,808,483 A * 9/1998 Sako .......................... 326/113

OTHER PUBLICATIONS

Preliminary Notice of Rejection of the IPO (2 pages) (Taiwanese Patent Office); w/English Translation (3 pages); Jul. 3, 2003.
Hayes, John P.; *Computer Architecture and Organization*; 1978; pp. 148–151.

* cited by examiner

*Primary Examiner*—Mohammad H. Ghayour
*Assistant Examiner*—Pankaj Kumar
(74) *Attorney, Agent, or Firm*—Myers Bigel Sibley & Sajovec, P.A.

(57) ABSTRACT

A transmission circuit that conducts signals between integrated circuit devices includes a first driver circuit that generates a first transmit signal in response to first and second input signals, the first transmit signal being transmitted from the integrated circuit device. A first conductive line is electrically coupled to the first driver circuit and conducts the first transmit signal. A second driver circuit generates a second transmit signal in response to the first transmit signal and a third input signal, the second transmit signal being transmitted from the integrated circuit device. A second conductive line is electrically coupled to the second driver circuit and conducts the second transmit data signal. Related methods are also disclosed.

8 Claims, 3 Drawing Sheets

SIGNAL TRANSMISSION CIRCUITS THAT USE MULTIPLE INPUT SIGNALS TO GENERATE A RESPECTIVE TRANSMIT SIGNAL AND METHODS OF OPERATING THE SAME

RELATED APPLICATION

This application claims the benefit of Korean Patent Application No. 98-45734, filed Oct. 29, 1998, the disclosure of which is hereby incorporated herein by reference.

FIELD OF THE INVENTION

The present invention relates to signal transmission in general, and more particularly, to signal transmission between integrated circuit devices.

BACKGROUND OF THE INVENTION

Many techniques have been developed to reduce the amount of noise introduced into data transmitted between integrated circuit (IC) devices. Two such data transmission techniques include single-ended interfaces and differential interfaces.

Referring to FIG. 1, a conventional single-ended interface can include integrated circuit devices 101 and 121 and a transmission line 111 therebetween. The integrated circuit device 101 includes a driver 103 and a pad 105, and the integrated circuit device 121 includes a receiver 123 and a pad 125. The transmission line 111 is connected between the pads 105 and 125. The driver 103 compares input data S1 to a reference voltage Vref, generates a high or low level signal, and transmits the signal on the transmission line 111. The signal is transferred to the receiver 123 via the transmission line 111. The receiver 123 compares the signal transferred via the transmission line 111 to the reference voltage Vref, and produces the data S1. Unfortunately, the integrity of data transferred using single-ended interfaces may be adversely affected by the presence of common mode noise, such as echo or ground bounce.

Referring to FIG. 2, a differential interface can include integrated circuit devices 201 and 221 and transmission lines 211 and 213 therebetween. The integrated circuit device 201 includes drivers 203 and 205 and pads 207 and 209. The integrated circuit device 221 includes a receiver 223 and pads 225 and 227. The transmission lines 211 and 213 electrically couple the pad 207 to the pad 225 and the pad 209 to the pad 227 respectively. The driver 203 amplifies input data S1 and transmits the input data on the transmission line 211, and the driver 205 amplifies an inverted signal S1B of the input data S1 and transmits the inverted signal on the transmission line 213. The data S1 and S1B are input to the receiver 223 via the transmission lines 211 and 213, respectively. The receiver 223 compares the signals S1 and S1B transmitted via the transmission lines 211 and 213, and produces the data S1. Unfortunately, the data integrity of a signal transmitted using a differential method may be adversely affected by common mode noise. In addition, the use of a differential interface may complicate the structure of the interface, thereby possibly increasing the cost of manufacturing the interface.

SUMMARY OF THE INVENTION

It is, therefore, an object of the present invention to allow improvement in the transmission of signals between integrated circuit devices.

It is another object of the present invention to allow improved noise immunity for signals transmitted between integrated circuit devices.

It is another object of the present invention to allow reductions in cost of interfaces used to transmit signals between integrated circuits.

These, and other objects may be provided by a transmission circuit that includes a first driver circuit that generates a first transmit signal in response to first and second input signals, the first transmit signal being transmitted from the integrated circuit device. A second driver circuit generates a second transmit signal in response to the first transmit signal and a third input signal, the second transmit signal being transmitted from the integrated circuit device. Accordingly, the likelihood of data loss can be reduced despite the presence of common mode noise. The use of one transmission line per receiver may also simplify the structure of an embodiment according to the present invention.

In a further aspect of the present invention, a first pad is electrically coupled to the first driver circuit and a second pad is electrically coupled to the second driver circuit.

In another aspect of the present invention, a pad is electrically coupled to the first input signal, wherein the first input signal is transmitted from the integrated circuit device.

In still another aspect of the present invention, a first detector circuit is electrically coupled to the first and second input signals and detects when the first and second input signals are a high logic level. A second detector circuit is electrically coupled to the first and second input signals and detects when the first and second input signals are a low logic level. A transmit signal generator is electrically coupled to the first and second detectors and generates the first transmit signal at a first voltage level when at least one of the first and second detector circuits detects that the first and second input signals are both a high logic level and that generates the first transmit signal at a second voltage level when at least one of the first and second detector circuits detects that the first and second input signals are both a low logic level.

DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
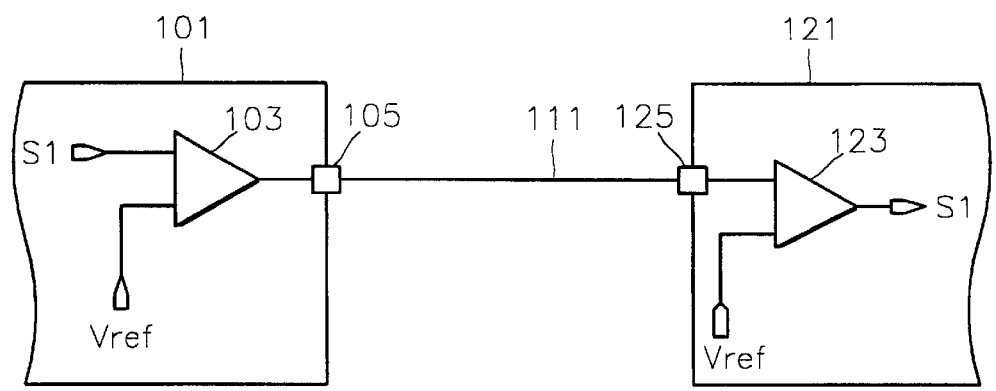
FIG. 1 is a circuit schematic of a conventional single-ended interface.
Figure 2:
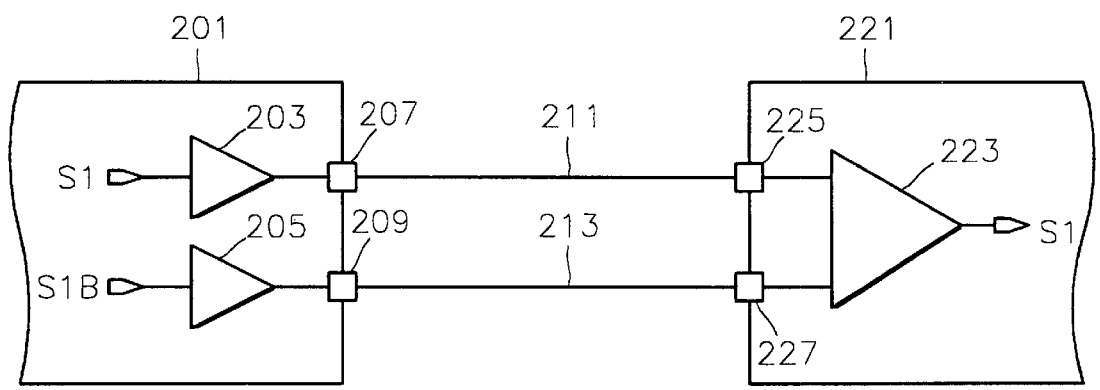
FIG. 2 is a circuit schematic of a conventional differential interface.
Figure 3:
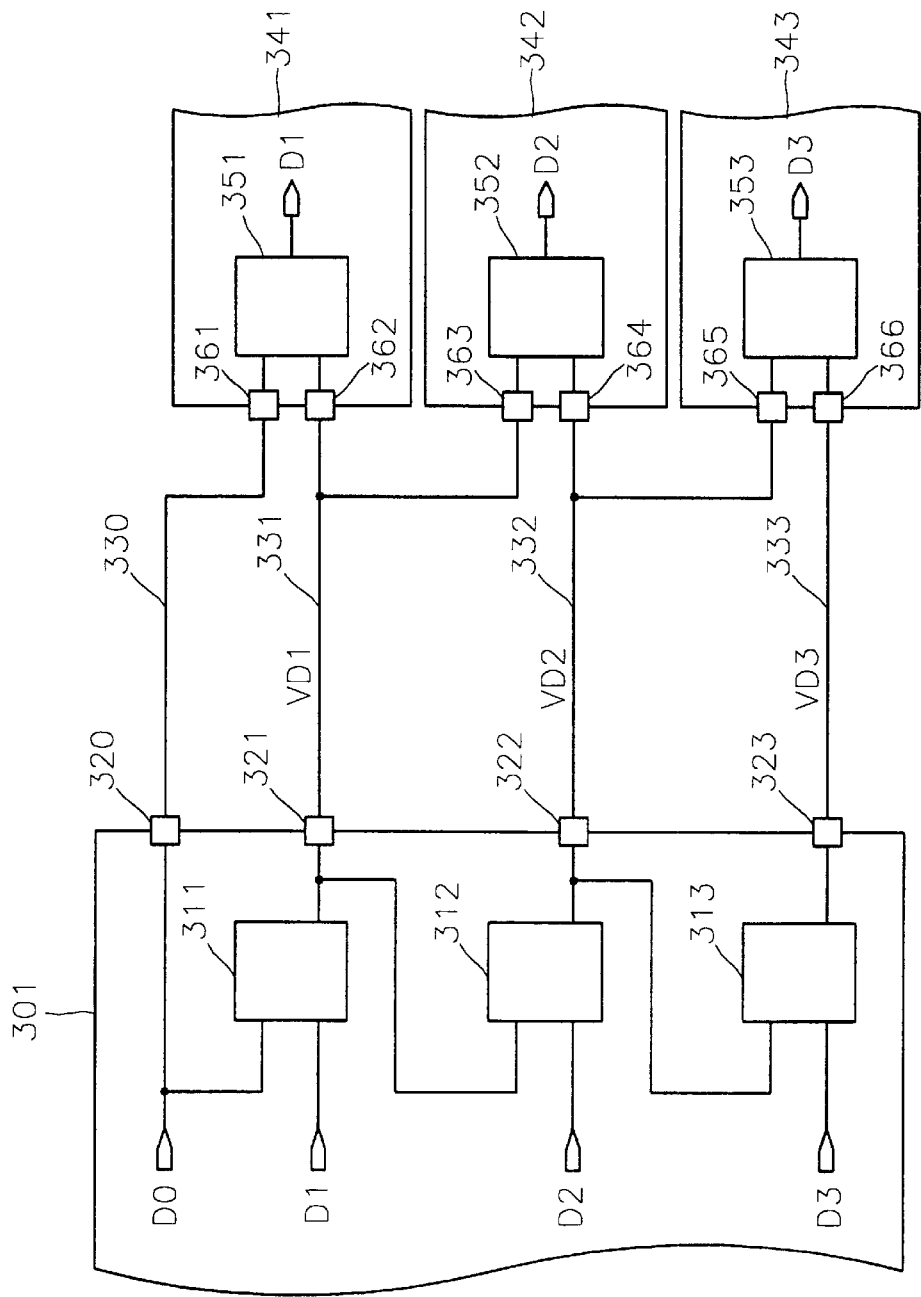
FIG. 3 is a circuit schematic of transmission and reception circuits according to a preferred embodiment of the present invention.

According to FIG. 3, a first driver 311 in a first integrated circuit 301 compares the respective logic levels of data D0 and data D1, and generates a transmit signal VD1. When the logic levels of the data D0 and D1 are different, the first driver 311 generates the transmit signal VD1 as a high voltage level. If the logic levels of the data D0 and D1 are the same, the first driver 311 generates the transmit signal VD1 as a low voltage level. For example, when the logic level of the data D0 is low and the logic level of the data D1 is high, the first driver 311 generates the transmit signal VD1 as a high voltage level. When both the logic levels of the data D0 and D1 are low, the first driver 311 generates the transmit signal VD1 as a low voltage level.

The transmit signal VD1 generated by the first driver 311 is transmitted to a transmission line 331 via a pad 321. The integrated circuit device 301 transmits data D0 on a dummy transmission line 330 via the pad 320.

A first receiver 351 in a second integrated circuit 341 compares the data D0 and the transmit signal VD1 received as input via pads 361 and 362, respectively, and recovers the data D1. The first receiver 351 calculates the absolute value of the difference between the voltage levels of the data D0 and transmit signal VD1, and compares the absolute value of the difference with a threshold voltage. In a preferred embodiment, the voltage threshold is about 0.8 volts. When the absolute value is greater than the threshold voltage, the first receiver 351 outputs data of high voltage level. When the absolute value is less than the threshold voltage, the first receiver 351 outputs data of low voltage level.

Alternatively, the first driver 311 can generate a transmit signal VD1 of low voltage level when the voltage levels of the data D0 and D1 are different, and generate a transmit signal VD1 of high voltage level when they are the same. In this case, the first receiver 351 outputs the data D1 as a low voltage level when the absolute value of the difference between the voltage levels of the data D0 and the signal VD1 input via the pads 361 and 362, respectively, is greater than the threshold voltage. When the absolute value is less than the threshold voltage, the receiver 351 outputs the data D1 as a high voltage level.

A second driver 312 compares the voltage levels of the transmit signal VD1 and data D2, and outputs the result as a transmit signal VD2. A third driver 313 compares the voltage levels of the transmit signal VD2 and data D3 with each other, and outputs the result as a transmit signal VD3. The operation of the second and third drivers 312 313 is analogous to the operation of the first driver 311. The second receiver 352 compares the transmit signal VD1 to the transmit signal VD2, and recovers the data D2, and a third receiver 353 compares the transmit signal VD2 to the transmit signal VD3, and generates data D3. The operation of the second and third receivers 352 353 is analogous to the operation of the first receiver 351. It will be understood that more drivers and receivers can be used.

In another embodiment, the dummy transmission line 330 may be eliminated. In such an embodiment, for example, the first driver 311 receives the data D1 and generates the transmit signal VD1 either as the same voltage level as the data D1 or as a different voltage level. Also, the first receiver 351 receives only the transmit signal VD1 and produces the data D1 according to the voltage level of the signal VD1.

Figure 4:
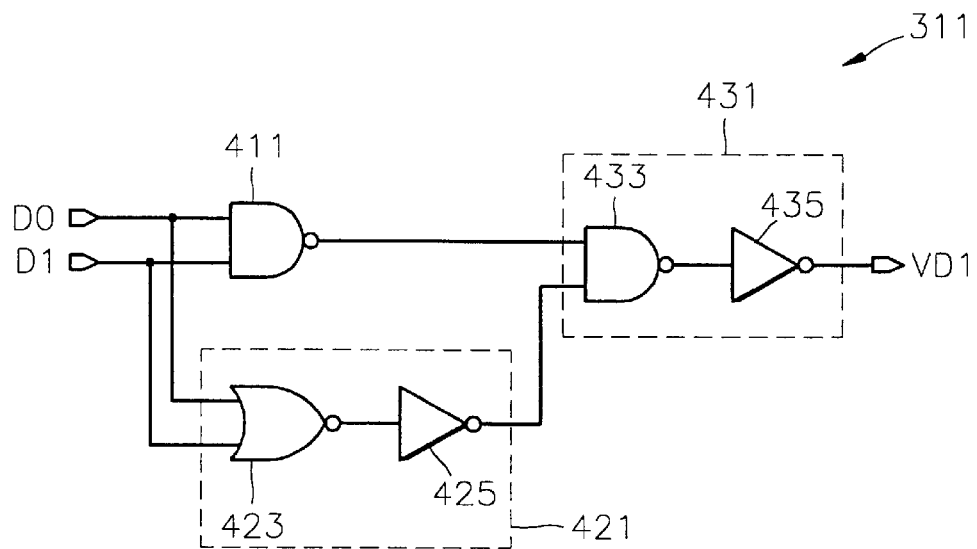
FIG. 4 is a circuit schematic of the driver circuit shown in FIG. 3.

FIG. 4 is a circuit schematic diagram of the driver 311 of FIG. 3. A first detector circuit 411 receives data D0 and D1, and includes a NAND gate for performing a NAND operation on the received data. A second detector circuit 421 receives the data D0 and D1, and performs an OR operation on the received data. That is, the second detector circuit 421 outputs a logic high when either the data D0 and D1 is logic high, and outputs a logic low when both the data D0 and D1 are logic low. The second detector circuit 421 includes a NOR gate 423 and an inverter 425.

A transmit generator circuit 431 performs an AND operation on the outputs of the first and second detector circuits 411 and 421, and generates a signal VD1. That is, the transmit generator 431 generates the signal VD1 as logic low when any one of the outputs of the first and second detector circuits 411 421 is a low logic level. When both of the outputs of the first and second detector circuits 411 421 are a high logic level, the transmit generator circuit 431 generates the signal VD1 as a high logic level. As shown in FIG. 3, the transmit generator circuit 431 can include a NAND gate 433 and an inverter 435.

Figure 5:
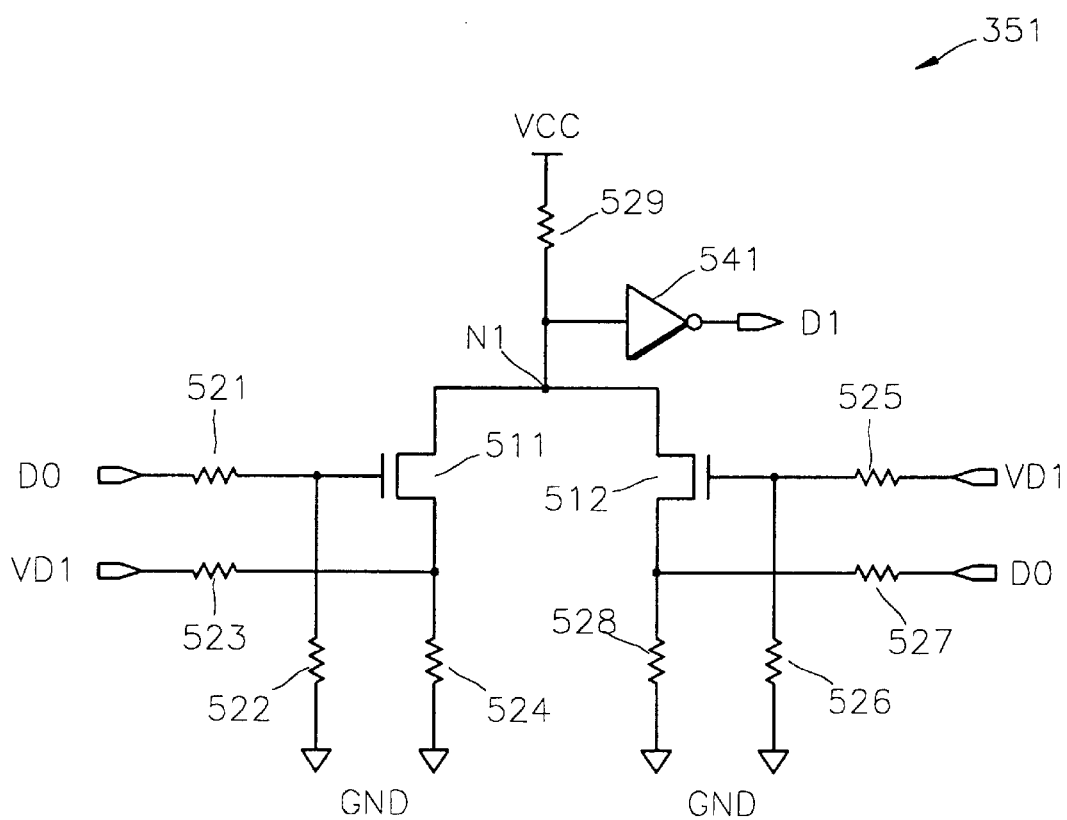
FIG. 5 is a circuit schematic of the receiver circuit shown in FIG. 3.

Referring to FIG. 5, the first receiver circuit 351 receives the data D0 and the transmit signal VD1 via resistors 521, 523, 525 and 527, and provides the output data D1 via an inverter 541. The data D0 is input to the gate of the NMOS transistor 511 via the resistor 521, and the transmit signal VD1 is input to the gate of the NMOS transistor 512 via the resistor 525. Accordingly, the NMOS transistor 511 is turned on when the voltage level of the data D0 is high, and is turned off when it is low. The NMOS transistor 512 is turned on when the voltage level of the signal VD1 is high, and is turned off when it is low.

The output data D1 is determined by the voltage level of the data D0 and the voltage level of the transmit signal VD1. When the voltage levels of the data D0 and transmit signal VD1 are both low, the NMOS transistors 511 and 512 are both turned off. The voltage level of a node N1 becomes high via a supply voltage VCC, and is inverted by an inverter 541, thereby causing the voltage level of the output data D1 to become low.

When the voltage level of the data D0 is low, and the voltage level of the transmit signal VD1 is high, the NMOS transistor 511 is turned off, and the NMOS transistor 512 is turned on. Thus, the node N1 is electrically coupled to the junction of the resistors 527 and 528. The voltage level of the node N1 becomes low, and is inverted by the inverter 541, and thus the voltage level of the output data D1 becomes high.

When the voltage level of the data D0 is high, and the voltage level of the signal VD1 is low, the NMOS transistor 511 is turned on, and the NMOS transistor 512 is turned off. Thus, the node N1 is electrically coupled to the junction of the resistors 523 and 524. The voltage level of the node N1 becomes low, and is inverted by the inverter 541, thereby causing the voltage level of the output data D1 to become high.

When the voltage levels of the data D0 and VD1 are both high, the NMOS transistors 511 and 512 are both turned on. In this case, the sources of the NMOS transistors 511 and 512 are each maintained at a high voltage level by the high voltage level signal VD1 and data D0 so that the voltage of the node N1 is kept high when both the NMOS transistors 511 and 512 are turned on. The voltage of the node N1 is inverted by the inverter 541, thereby causing the voltage level of the output data D1 to become low.

In operation of the first receiver 351, if the absolute value of the difference between the voltage levels of the data D0 and the signal VD1 is higher than the voltage threshold, the voltage level of the output data D1 becomes high. If the absolute value of the difference between the voltage levels of the data D0 and the signal VD1 is lower than the voltage threshold, the output data D1 becomes logic low.

When the inverter 541 is not used, if the absolute value of the difference between the voltage levels of the data D0 and the signal VD1 is higher than the voltage threshold, the voltage level of the output data D1 becomes low. If the absolute value of the difference between the voltage levels of the data D0 and the transmit signal VD1 is lower than the voltage threshold, the voltage level of the output data D1 becomes high. The voltage levels of the data D2 and D3 output by the second and third receivers 352, 353 of FIG. 3 can be the same or different depending on the characteristics of the second and third drivers 312, 313.

The operation of the first receiver circuit 351 can, therefore, be summarized as shown below.

| data (D0) | Transmit signal (VD1) | Output data (D1) |
|---|---|---|
| 0 | 0 | 0 |
| 0 | 1 | 1 |
| 1 | 0 | 1 |
| 1 | 1 | 0 |

Accordingly, the likelihood of data loss can be reduced despite the presence of common mode noise.

The use of one transmission line per receiver may simplify the structure of an embodiment according to the present invention. For example, as shown in FIG. 3, the first–third transmission lines 331–333 electrically couple the first–third drivers 311–313 and to the first–third receivers 351–353 respectively, which may simplify an embodiment according to the present invention, thereby allowing a reduction in manufacturing costs.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A reception circuit in an integrated circuit device that conducts signals between integrated circuit devices, the reception circuit comprising:

a first conductive line that conducts a first transmit signal, based on a first data bit of a data word, from a first to a second integrated circuit device across a space therebetween;

a second conductive line that conducts a second transmit signal across the space, the second transmit signal comprising a combined data bit that is based on the first transmit signal conducted across the space and a second data bit of the data word; and a receiver circuit, electrically coupled to the first and second conductive lines, configured to receive the first and second transmit signals to provide a respective first received signal based on a comparison of voltage levels associated with the first and second transmit signals, wherein the receiver circuit generates an output signal of a first output voltage level when an absolute difference of a first transmit voltage level of the first transmit signal and a second transmit voltage level of the second transmit signal is greater than a threshold voltage and generates the output signal of a second output voltage level when the absolute difference of the first transmit voltage level of the first transmit signal and the second transmit voltage level of the second transmit signal is less than or equal to the threshold voltage.

2. The reception circuit of claim 1 further comprising:

a first pad, electrically coupled to the first conductive line and the receiver circuit; and a second pad, electrically coupled to the second conductive line and the receiver circuit.

3. The reception circuit of claim 1, wherein the first and second transmit signals comprise data bits included in a data word.

4. The reception circuit of claim 3, wherein the first transmit signal comprises a dummy data signal included in the data word.

5. The reception circuit of claim 1, wherein the first and second transmit signals comprise sequentially ordered data bits included in a data word.

6. The reception circuit of claim 1, wherein the receiver circuit comprises:

a first transistor including a first gate node, a first source node and a first drain node, wherein the first gate node is electrically coupled to the first conductive line and the first drain node is electrically coupled to the second conductive line; and a second transistor including a second gate node, a second source node and a second drain node, wherein the second gate node is electrically coupled to the second conductive line and the second drain node is electrically coupled to the first conductive line.

7. The reception circuit of claim 6 further comprising:

an output circuit, electrically coupled to the first and second source nodes, wherein the output circuit provides an output signal in response to the first and second transmit signals.

8. The reception circuit of claim 1, wherein the first and second data bits comprise an Nth data bit of the data word and an Nth+1 data bit of the data word respectively.

* * * * *